US012155182B2

(12) United States Patent
Karle

(10) Patent No.: US 12,155,182 B2
(45) Date of Patent: Nov. 26, 2024

(54) ELECTRICAL EQUIPMENT WITH ADDITIONAL COMPARTMENT AND WIRING TO ACCOUNT FOR TEMPERATURE LIMITATIONS OF CONNECTED CONDUCTORS

(71) Applicant: KARLE PATENTS INC., Edmonton (CA)

(72) Inventor: Shawn Murray Karle, Edmonton (CA)

(73) Assignee: Karle Patents Inc., St. Albert (CA)

( * ) Notice: Subject to any disclaimer, the term of this patent is extended or adjusted under 35 U.S.C. 154(b) by 325 days.

(21) Appl. No.: 17/380,895

(22) Filed: Jul. 20, 2021

(65) Prior Publication Data

US 2022/0013997 A1 Jan. 13, 2022

Related U.S. Application Data

(63) Continuation of application No. 16/841,555, filed on Apr. 6, 2020, now abandoned, which is a continuation
(Continued)

(51) Int. Cl.
*H02B 1/30* (2006.01)
*H02B 1/04* (2006.01)
(Continued)

(52) U.S. Cl.
CPC .................. *H02B 1/30* (2013.01); *H02B 1/04* (2013.01); *H02B 1/20* (2013.01); *H02B 1/202* (2013.01);
(Continued)

(58) Field of Classification Search
CPC ....................................................... H01B 1/04
(Continued)

(56) References Cited

U.S. PATENT DOCUMENTS 3,025,432 A 3/1962 Giegerich
3,857,044 A 12/1974 Papoi et al.
(Continued)

FOREIGN PATENT DOCUMENTS

CA 1253953 5/1989
CA 2554685 1/2008
(Continued)

OTHER PUBLICATIONS

Roel van Benthem et al., Thermal Analysis of Wiring Bundles for Weight Reduction and Improved Safety, 41st International Conference on Environmental Systems Jul. 17-21, 2011, Portland, Oregon, Abstract (Year: 2011).*
(Continued)

*Primary Examiner* — Stanley Tso
(74) *Attorney, Agent, or Firm* — Robert A. Nissen

(57) ABSTRACT

A pre-fabricated electrical apparatus has: a main housing configured to enclose electrical equipment in use; a splice compartment mounted, or integrally formed, external to and adjacent the main housing; a conductor passage defined between the main housing and the splice compartment; and in which the main housing and splice compartment are configured to, in use, permit a conductor to extend from a first conductor termination point, defined within the main housing, to a second conductor termination point, defined within the splice compartment, with the second termination point having a temperature rating that is higher than a temperature rating of the electrical equipment. A method includes: prefabricating, at a prefabrication facility, an electrical apparatus by mounting or integrally forming a splice compartment adjacent an external part of a main housing; and installing the electrical apparatus at an end user facility, which is remote from the prefabrication facility.

25 Claims, 8 Drawing Sheets

Related U.S. Application Data of application No. 15/576,698, filed as application No. PCT/CA2017/050617 on May 19, 2017, now Pat. No. 10,615,578.

(60) Provisional application No. 62/368,573, filed on Jul. 29, 2016.

(51) Int. Cl.

| | | |
|---|---|---|
| *H02B 1/20* | (2006.01) | |
| *H02B 1/32* | (2006.01) | |
| *H02B 3/00* | (2006.01) | |
| *H02B 1/06* | (2006.01) | |
| *H02B 1/56* | (2006.01) | |

(52) U.S. Cl.
CPC ............... *H02B 1/32* (2013.01); *H02B 3/00* (2013.01); *H02B 1/06* (2013.01); *H02B 1/56* (2013.01)

(58) Field of Classification Search
USPC ........................................................ 174/520
See application file for complete search history.

(56) References Cited

U.S. PATENT DOCUMENTS

| | | |
|---|---|---|
| 4,369,484 A | 1/1983 | Fugate et al. |
| 4,675,598 A | 6/1987 | Boichot-Castagne |
| 5,191,502 A | 3/1993 | Epstein et al. |
| 5,196,982 A | 3/1993 | Landsberg et al. |
| 5,510,948 A | 4/1996 | Tremaine et al. |
| 5,544,003 A | 8/1996 | Vaughan |
| 5,612,579 A | 3/1997 | Wisbey et al. |
| 5,675,194 A | 10/1997 | Domigan |
| 5,789,828 A | 8/1998 | Tremaine et al. |
| 6,035,247 A | 3/2000 | Sugihara et al. |
| 6,055,144 A | 4/2000 | Reid |
| 6,091,316 A | 7/2000 | Hofsass |
| 6,421,229 B1 | 7/2002 | Campbell et al. |
| 6,538,870 B2 | 3/2003 | Seese et al. |
| 6,731,484 B2 | 5/2004 | Pebles et al. |
| 6,747,368 B2 | 6/2004 | Jarrett |
| 6,947,813 B2 | 9/2005 | Sugihara et al. |
| 7,256,984 B2 | 8/2007 | Kim et al. |
| 7,623,043 B2 | 11/2009 | Mizra et al. |
| 7,652,871 B2 | 1/2010 | Caggiano et al. |
| 7,782,596 B2 | 8/2010 | Ross |
| 7,872,379 B2 | 1/2011 | Fuller et al. |
| 8,030,799 B1 | 10/2011 | Flegel |
| 8,108,321 B2 | 1/2012 | Neal et al. |
| 8,169,103 B2 | 5/2012 | Yu |
| 8,254,089 B2 | 8/2012 | Cosley et al. |
| 8,324,755 B2 | 12/2012 | Stair et al. |
| 8,415,830 B2 | 4/2013 | Lim et al. |
| 8,514,551 B2 | 8/2013 | Cosley et al. |
| 8,599,536 B1 | 12/2013 | Jorgensen et al. |
| 8,638,008 B2 | 1/2014 | Baldwin et al. |
| 8,687,348 B2 | 4/2014 | Peplinski et al. |
| 8,947,254 B2 | 2/2015 | Caldwell et al. |
| 8,982,539 B2 | 3/2015 | Weighell et al. |
| 9,211,025 B1 | 12/2015 | Elhawwashy |
| 9,343,925 B1 | 5/2016 | Flegel |
| 9,397,456 B2 | 7/2016 | Yanniello |
| 9,837,804 B2 | 12/2017 | Tremaine |
| 10,008,837 B2 | 6/2018 | Yanniello |
| 10,067,199 B2 | 9/2018 | Eldridge et al. |
| 10,615,578 B2 | 4/2020 | Karle |
| 2003/0007369 A1 | 1/2003 | Gilbreth et al. |
| 2004/0075343 A1 | 4/2004 | Wareham et al. |
| 2006/0022522 A1 | 2/2006 | Plummer |
| 2008/0167755 A1 | 7/2008 | Curt |
| 2008/0255782 A1 | 10/2008 | Bilac et al. |
| 2009/0185335 A1 | 7/2009 | Kwon |
| 2009/0244817 A1 | 10/2009 | Moyer |
| 2009/0255727 A1 | 10/2009 | Tarchinski |
| 2011/0062888 A1* | 3/2011 | Bondy ............... H05B 45/3725 315/294 |
| 2011/0148213 A1* | 6/2011 | Baldwin ............... H02J 1/001 307/82 |
| 2013/0006436 A1 | 1/2013 | Masters et al. |
| 2013/0050906 A1* | 2/2013 | Peplinski ............... H02B 1/26 361/622 |
| 2014/0214218 A1 | 7/2014 | Eldridge et al. |
| 2015/0207301 A1 | 7/2015 | Franks et al. |
| 2015/0288225 A1 | 10/2015 | Dent |
| 2015/0317596 A1 | 11/2015 | Hejazi |
| 2016/0128208 A1 | 5/2016 | Bolik et al. |
| 2016/0163476 A1 | 6/2016 | Okerman |
| 2016/0225562 A1 | 8/2016 | Franks et al. |
| 2016/0241007 A1* | 8/2016 | Tremaine ............... H02G 3/081 |
| 2017/0091707 A1 | 3/2017 | Akselrod et al. |
| 2017/0091711 A1 | 3/2017 | Akselrod et al. |

FOREIGN PATENT DOCUMENTS

| | | |
|---|---|---|
| CA | 2986409 | 1/2018 |
| CN | 203166627 | 8/2013 |
| CN | 104701975 | 6/2015 |
| EP | 0345851 | 12/1989 |
| EP | 0748016 | 12/1996 |
| EP | 2835078 | 2/2015 |
| GB | 2109163 | 5/1983 |
| GB | 2351852 | 1/2001 |
| GB | 2360884 | 10/2001 |
| RU | 2121697 | 11/1998 |
| WO | 2012007831 | 5/2012 |
| WO | 2012021759 | 5/2012 |
| WO | 2013046235 | 4/2013 |
| WO | 2014080389 | 5/2014 |
| WO | 2014146776 | 9/2014 |

OTHER PUBLICATIONS

International Search Report, corresponding international application No. PCT/CA2017/050617, Sep. 13, 2017, 8 pages.

Examination report received on corresponding Canadian patent application No. 2,986,409, 5 pages.

Jim Pauley, Wire Temperature Ratings and Terminations, Data Bulletin, Mar. 2002, pp. 1-6, Bulletin No. 0110DB9901R2/02, Square D Company, Lexington, KY.

Canadian Standards Association, Canadian Electrical Code, Section 4-006: Temperature limitations, 2015, pp. 20-21 (1 page total), 23rd ed., CSA Group, Canada.

Canadian Standards Association, Canadian Electrical Code, Table 1: Allowable ampacities for single unshielded copper conductors, rated not more than 5000 V, in free air (based on an ambient temperature of 30 C), 2015, pp. 302-303 (1 page total), 23rd ed., CSA Group, Canada.

Canadian Standards Association, Standards Update Notice—CSA C22.2 No. 31-14, Swtichgear Assemblies, Mar. 1, 2014.

Schneider Electric, Drawing of auxiliary busway section for switchboard, product shown therein believed to be public in 2010, 1 page.

IEEE Standards Association, IEEE Standard for Metal-Enclosed Low-Voltage (1000 Vac and below, 3200 Vdc and below) Power Circuit Breaker Switchgear, 2015, 1 page.

Excerpts from "CSA C22.2 No. 31-14 2014 Switchgear assemblies", 2014, 11 pages.

IEEE Standards Association, IEEE Standard for Metal-Enclosed LowVoltage (1000 Vac and below, 3200 Vdc and below) Power Circuit Breaker Switchgear, 2015, 84 pages.

IEEE Standards Association, IEEE Standards Interpretations for IEEE Std C37.20.1™-1993 IEEE Standard for Metal-Enclosed Low-Voltage Power Circuit Breaker Switchgear, Mar. 2005, 2 pages.

Schneider Electric, Power-Style Low Voltage Switchboards Catalog, available as early as Feb. 2012, 60 pages.

Schneider Electric, Wire Temperature Ratings and Terminations, available as early as Mar. 2002, 6 pages.

(56) References Cited

OTHER PUBLICATIONS

Excerpts from "IEEE Standard for Metal-Enclosed LowVoltage (1000 Vac and below, 3200 Vdc and below) Power Circuit Breaker Switchgear", 2015, 8 pages.

* cited by examiner

ELECTRICAL EQUIPMENT WITH ADDITIONAL COMPARTMENT AND WIRING TO ACCOUNT FOR TEMPERATURE LIMITATIONS OF CONNECTED CONDUCTORS

TECHNICAL FIELD

This document relates to electrical equipment with an additional compartment and wiring to account for temperature limitations of connected electrical equipment conductors, and in some cases this document relates to electrical distribution panels.

BACKGROUND

Electrical distribution panels are being modified for use with current transformers for metering purposes; however, such an installation may be a breach of the local building code, such as in Alberta, Canada. The Canadian Electrical Code does not allow the splicing of wires in a breaker compartment or the use of the distribution panel as a wire way, trough or tap point. Existing panels use a breaker temperature rating of 60/75 degrees Celsius for copper and or aluminum connected wires, which is typically about two thirds the temperature capacity of the installed conductor, thus creating inefficiencies in circuit design and capabilities. The relatively lower temperature rating of the breaker also increases the cost of connecting conductors that supply circuits as such are typically required to have an increased overall diameter to account for the lower temperature rating connection at the breaker terminal.

SUMMARY

A pre-fabricated electrical apparatus comprising: a main housing configured to enclose electrical equipment in use; a splice compartment mounted, or integrally formed, external to and adjacent the main housing; a conductor passage defined between the main housing and the splice compartment; and in which the main housing and splice compartment are configured to, in use, permit a conductor to extend from a first conductor termination point, defined within the main housing, to a second conductor termination point, defined within the splice compartment, with the second termination point having a temperature rating that is higher than a temperature rating of the electrical equipment.

A method is also disclosed comprising: prefabricating, at a prefabrication facility, an electrical apparatus by mounting or integrally forming a splice compartment adjacent an external part of a main housing; and installing the electrical apparatus at an end user facility, which is remote from the prefabrication facility.

A distribution panel is also provided including a first compartment containing a breaker, and a second compartment separated from the first compartment.

In various embodiments, there may be included any one or more of the following features: A connector lug electrically connected to the conductor at the second termination point. A conductor that extends between and defines both the first termination point and the second termination point. An external circuit conductor extends from outside both the splice compartment and main housing, and into electrical contact with the second termination point, the external circuit conductor having a temperature rating that is higher than the temperature rating of the electrical equipment in use. A cross-sectional diameter of the external circuit conductor is smaller than a cross-sectional diameter of the conductor. The splice compartment comprises a plurality of conductors that define respective first termination points and second termination points. The external circuit conductor comprises a plurality of respective external circuit conductors, each electrically connected between a respective conductor, of the plurality of conductors, and each forming part of a respective independent external circuit of a plurality of independent external circuits. Electrical equipment enclosed by the main housing, in which at least some of the plurality of conductors are pre-wired out-of-electrical contact with the electrical equipment. The external circuit conductor comprises an aluminum conductor, and in some cases the conductor comprises a non-aluminum conductor. The conductor and/or external circuit conductor comprises a copper conductor. The conductor has a length of 1.2 meters or greater. The conductor has a length of 1.2 to 1.8 meters. Electrical equipment enclosed by the main housing. The electrical equipment carries out one or more of the following electrical functions: distribution, switching, voltage modifying, current modifying, energy conversion, energy generation, light generation, or overcurrent protection. The electrical equipment comprises a distribution panel. The conductor forms part of a branch circuit, which includes a branch circuit breaker located within the main housing. A main overcurrent protection device connected one or both of upstream of the distribution panel or within the distribution panel, in which the second termination point has a temperature rating that is higher than a temperature rating of the main overcurrent protection device. The splice compartment comprises a plurality of splice compartments each containing respective conductors. The plurality of splice compartments comprise a primary splice compartment and a secondary splice compartment. The primary splice compartment is configured to supply electricity to the electrical equipment in use, and the secondary compartment is configured to receive electricity from the electrical equipment in use. The second termination point of the conductor of the primary splice compartment has a temperature rating that is higher than the temperature rating of the electrical equipment. Electrical equipment enclosed by the main housing, in which the electrical equipment comprises one or more of switchgear, a transformer, a motor control panel, a motor, a motor starter, a generator, a light fixture, a fused disconnect switch, an unfused disconnect switch, a power monitor, and a motor disconnect switch. The electrical equipment is rated to carry a maximum voltage of up to and including 600 V, although higher or lower voltages may be used. The splice compartment comprises a power metering device. The conductor passage is defined by a raceway that connects the main housing and splice compartment. Enclosing electrical equipment within the main housing. Extending a conductor between a first termination point, within the main housing, and a second termination point within the splice compartment, with the second termination point having a temperature rating that is higher than a temperature rating of the electrical equipment. The enclosing and extending stages are carried out during the prefabricating stage at the prefabrication facility. After installing, the electrical equipment carries out one or more of the following electrical functions: distribution, switching, voltage modifying, current modifying, energy conversion, energy generation, light generation, or overcurrent protection. The prefabrication facility is at least five kilometers away from the end user facility. The second compartment contains a terminal connection point having a higher than breaker temperature rating for branch circuit wires. The second compartment contains a current transformer configured to meter power. The second compartment contains a termination point configured to be part of an aluminum or copper conductor connection. The second compartment contains a wire way. The second compartment contains a wire splice connection point.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Figure 1:
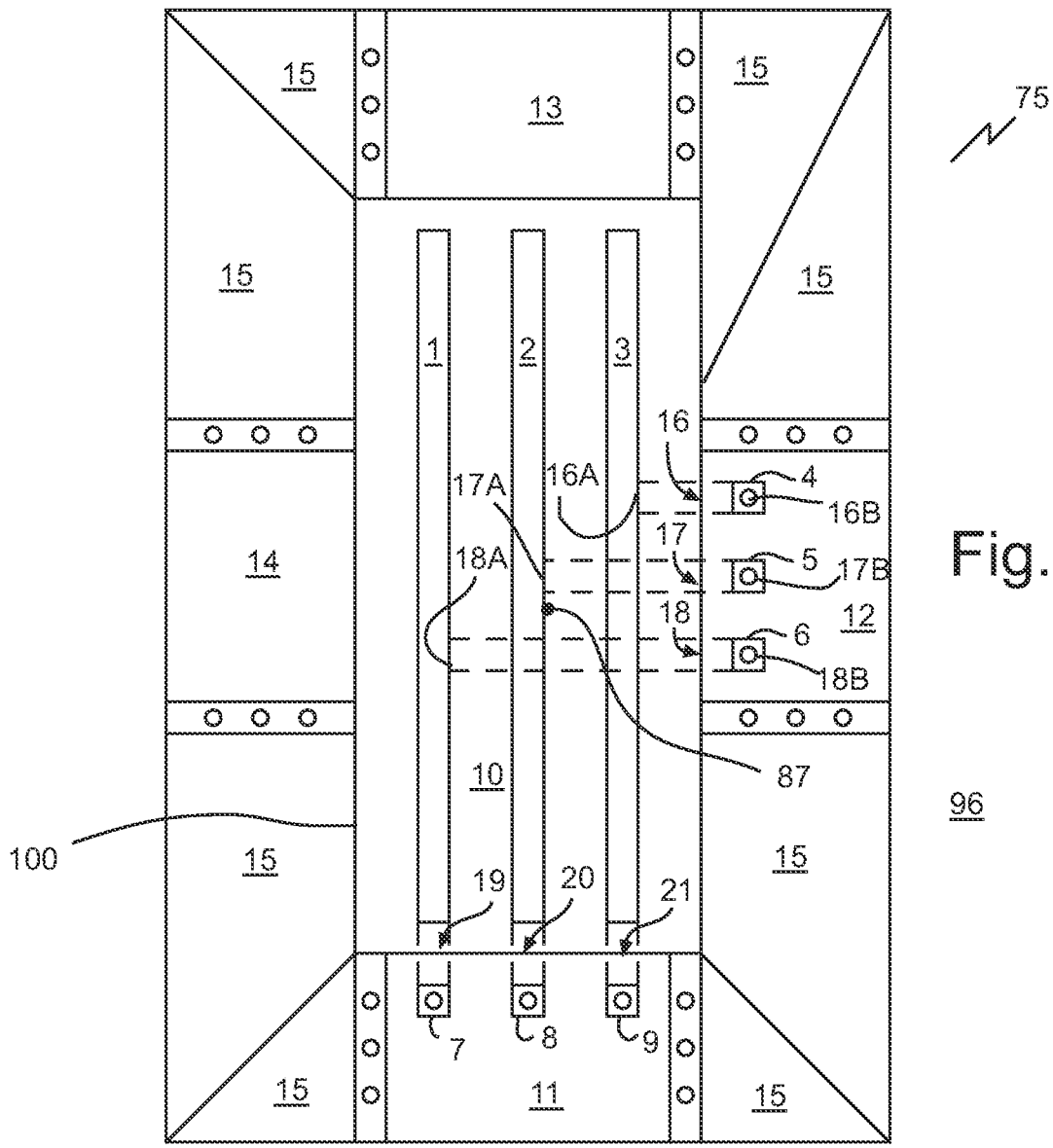
FIG. 1 is a front elevation schematic view of a distribution panel with primary and secondary splice compartments.

Immaterial modifications may be made to the embodiments described here without departing from what is covered by the claims.

Ampacity is a portmanteau for ampere capacity defined by National Electrical Safety Codes, in some North American countries. Ampacity is defined as the maximum amount of electric current a conductor or device can carry before sustaining immediate or progressive deterioration. Also described as current rating or current-carrying capacity, ampacity is the RMS electric current which a device or conductor can continuously carry while remaining within its temperature rating.

The ampacity of a conductor depends on:
a. its insulation temperature rating;
b. the electrical resistance of the conductor material;
c. frequency of the current, in the case of alternating current;
d. ability to dissipate heat, which depends on conductor geometry and its surroundings; and
e. ambient temperature.

All common electrical conductors have some resistance to the flow of electricity. Electric current flowing through such conductors may cause voltage drop and power dissipation, which heats conductors. Copper or aluminum can conduct a large amount of current without damage, but long before conductor damage, insulation would, typically, be damaged by the resultant heat.

The ampacity for a conductor is based on physical and electrical properties of the material and construction of the conductor and of its insulation, ambient temperature, and environmental conditions adjacent to the conductor. Having a large overall surface area can dissipate heat well if the environment can absorb the heat.

The allowed current in a conductor generally needs to be decreased (derated) when conductors are in a grouping or cable, enclosed in conduit, or an enclosure restricting heat dissipation. e.g. The United States National Electric Code, Table 310.15(B)(16), specifies that up to three 8 AWG copper wires having a common insulating material (THWN) in a raceway, cable, or direct burial has an ampacity of 50 A when the ambient air is 30° C., the conductor surface temperature allowed to be 75° C. A single insulated conductor in free air has 70 A rating.

Ampacity rating normally applies for continuous current, permitting short periods of overcurrent to occur without harm in most cabling systems. The acceptable magnitude and duration of overcurrent is a more complex topic than ampacity.

When designing an electrical system, one will normally need to know the current rating for the following:
a. Wires (conductors)
b. Printed Circuit Board traces, where included
c. Fuses
d. Circuit breakers; and
e. All or nearly all components used Every electrical circuit, and every portion of an electrical circuit, has an inherent temperature rating, above which some event will happen, such as the tripping of an adjacent overcurrent protection device, or the degradation of the conductor or conductor insulation leading to conductor failure. In some cases the temperature rating is determined by the overcurrent protection device within the environment, for example within a distribution panel, as the overcurrent protection device will be engaged to shut off currents that cause local temperatures above the temperature rating of the overcurrent protection device. An overcurrent protective device is a device capable of providing protection for service, feeder, and branch circuits and equipment over the full range of overcurrent between its rated current and its interrupting rating, and including a fuse and a circuit breaker.

The groundwork for a better understanding of temperature rating begins with a preliminary discussion of several relevant subjects that include: conductor ampacity and ambient temperature correction factors, adjustment factors wherever more than three current-carrying conductors are used, and conductor overcurrent protection. Proper sizing of conductors and overcurrent protection depends upon the application of the requirements outlined in all of these sections, see Table 1 below as an example.

TABLE 1

Allowable ampacities for not more than three copper conductors, rated not more than 5000 V and unshielded, in raceway or cable (based on ambient temperature of 30 degrees Celsius)

| Size, AWG or kcmil | Allowable ampacity | | | | | |
| --- | --- | --- | --- | --- | --- | --- |
|  | 60° C. | 75° C. | 90° C. | 110° C. | 125° C. | 200° C. |
| 14 | 15 | 20 | 25 | 25 | 30 | 35 |
| 12 | 20 | 25 | 30 | 30 | 35 | 40 |
| 10 | 30 | 35 | 40 | 45 | 45 | 60 |

TABLE 1-continued

Allowable ampacities for not more than three copper conductors, rated not more than 5000 V and unshielded, in raceway or cable (based on ambient temperature of 30 degrees Celsius)

| Size, AWG or kcmil | Allowable ampacity | | | | | |
|---|---|---|---|---|---|---|
| | 60° C. | 75° C. | 90° C. | 110° C. | 125° C. | 200° C. |
| 8 | 40 | 50 | 55 | 65 | 65 | 80 |
| 6 | 55 | 65 | 75 | 80 | 90 | 110 |
| 4 | 70 | 85 | 95 | 105 | 115 | 140 |
| 3 | 85 | 100 | 115 | 125 | 135 | 165 |
| 2 | 95 | 115 | 130 | 145 | 155 | 190 |
| 1 | 110 | 130 | 145 | 165 | 175 | 215 |
| 0 | 125 | 150 | 170 | 190 | 200 | 245 |
| 00 | 145 | 175 | 195 | 220 | 235 | 290 |
| 000 | 165 | 200 | 225 | 255 | 270 | 330 |
| 0000 | 195 | 230 | 260 | 290 | 310 | 380 |
| 250 | 215 | 255 | 290 | 320 | 345 | — |
| 300 | 240 | 285 | 320 | 360 | 385 | — |
| 350 | 260 | 310 | 350 | 390 | 420 | — |
| 400 | 280 | 335 | 380 | 425 | 450 | — |
| 500 | 320 | 380 | 430 | 480 | 510 | — |
| 600 | 350 | 420 | 475 | 530 | 565 | — |
| 700 | 385 | 460 | 520 | 580 | 620 | — |
| Col. 1 | Col. 2 | Col. 3 | Col. 4 | Col. 5 | Col. 6 | Col. 7 |

The temperature rating associated with a conductor's ampacity must be selected and coordinated so that the lowest temperature rating of any connected termination, conductor, or device is not exceeded. Conductor temperature limitations can be compared to the strength of a chain. A chain is only as strong as its weakest link.

For conductors, every termination (or connection) point is a potential weak link. The fact that a conductor's insulation has a 90 degrees C. temperature rating does not mean that the ampacity is automatically selected from the 90 degrees C. column. The lowest temperature rating of the termination points, along the conductor's path, determines the maximum ampacity. A terminal is the point at which a conductor from an electrical component, device or network comes to an end and provides a point of connection to external circuits. A termination point may simply be the end of a wire or it may be fitted with a connector or fastener.

The termination point with the lowest temperature rating may be the determining factor for selecting the conductor's ampacity. If the temperature rating of a termination point is unknown, the conductor ampacity must usually be selected from the 60 degrees C. column regardless of the insulation type. Likewise, if any connection point has a temperature rating of 60 degrees C., the conductor's ampacity may need to be selected from the 60 degrees C. column. Generally, where a conductor has a 90 degrees C. temperature rating, and the lowest temperature rating of the termination points is 75 degrees C. (or 60/75 degrees C.), the conductor's ampacity must be selected from the 75 degrees C. column. Different codes, such as the NEC (National Electrical Code—U.S.) and the CEC (Canadian Electrical Code), have different specific rules, however, such rules are generally based on the inherent properties of the conductor and the environment of the conductor.

Figure 4:
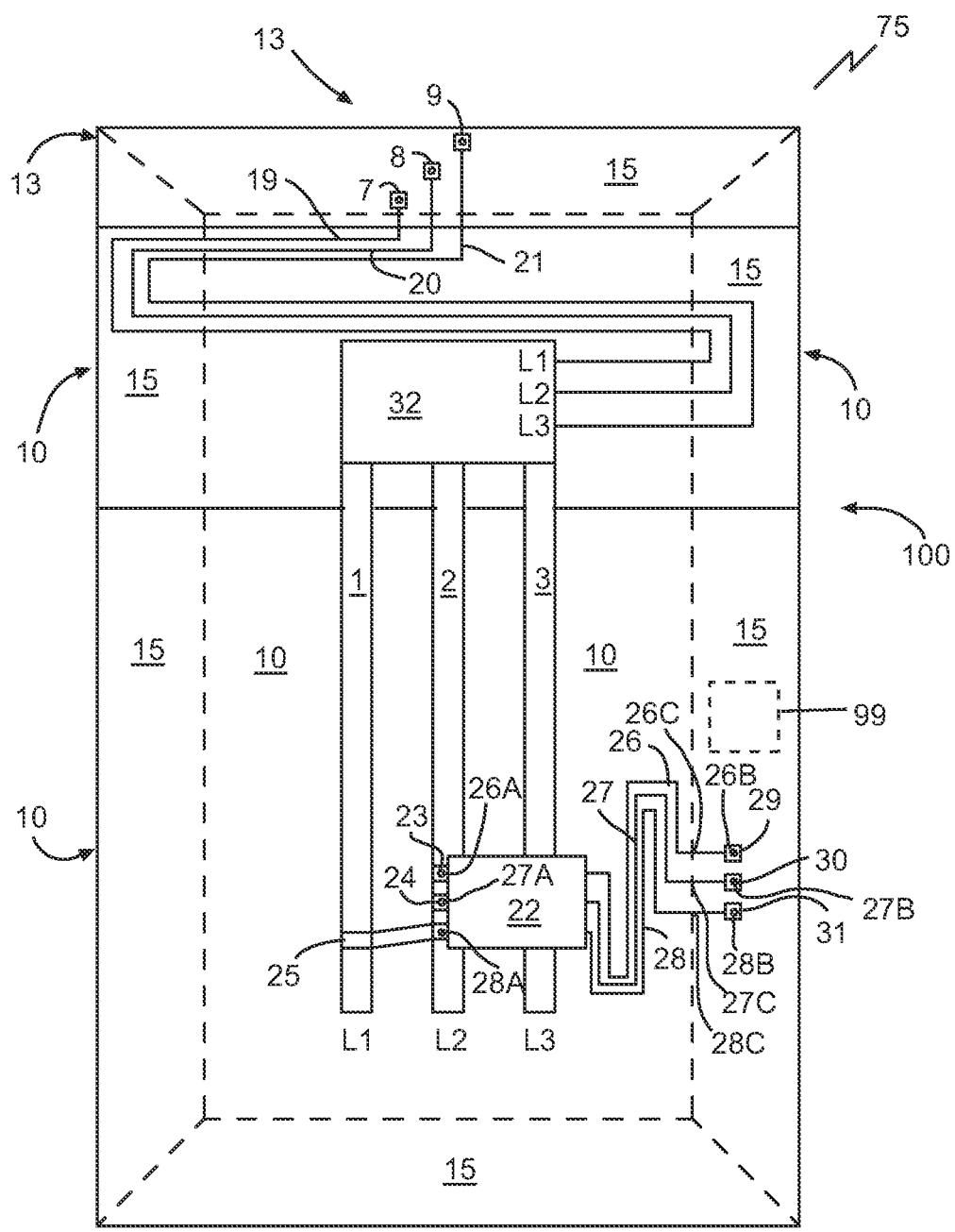
FIG. 4 is a partial front elevation schematic view of an embodiment of a distribution panel with primary and secondary splice compartments.

Referring to FIG. 4, a pre-fabricated electrical apparatus 75 is disclosed, comprising a main body/main housing 10, and one or more splice compartment, such as compartment 15. The main housing 10 may be configured to enclose electrical equipment in use, such as a distribution panel 100. The splice compartment 15 may be mounted, or integrally formed, external to and adjacent the main housing 10. A conductor passage, such as passage 26C may be defined between the main housing 10 and the splice compartment 15.

Referring to FIG. 4, the apparatus 75 may comprise a conductor, such as conductor 26, that extends between and defines both a first termination point 26A within the main housing 10 and a second termination point 26B within the splice compartment 15. In the example shown, three conductors 26, 27, and 28 are shown defining respective first termination points 26A, 27A, and 28A, and second termination points 26B, 27B, and 28B. Conductors may be bare, covered, or insulated. Conductors include wires, cables and other shapes and strips of electrically conductive material intended to carry voltage.

Referring to FIGS. 1 and 4, the splice compartment may comprise a plurality of splice compartments, such as compartments 11, 12, 13, 14, and 15. In some cases more than one compartment contains respective conductors. Referring to FIG. 4, in some cases plural conductors, such as conductors 26, 27, and 28, may be positioned within a single compartment such as compartment 15, with each of the plurality of conductors defining respective first termination points and second termination points.

Referring to FIG. 1, the plurality of splice compartments may comprise a primary splice compartment, such as compartments 11, 12, 13, and 14, and a secondary splice compartment 15. The primary splice compartment or compartments may be configured to, in use, supply electricity, for example from a supply or feeder line, to the electrical equipment such as panel 100, for example via compartment 11 and conductor lugs 7, 8, 9 and conductors 19, 20, and 21 to bus bars 1, 2, and 3, respectively. Referring to FIG. 4, the secondary compartment may be configured to receive electricity from the electrical equipment in use to supply to an external load, such as an external circuit (not shown).

Referring to FIG. 4, the second termination point, for example points 26B, 27B, and 28B, of the conductor, in this case conductors 26, 27, and 28, respectively, of the secondary splice compartment 15 may have a temperature rating that is higher than a temperature rating of the electrical equipment, in this case panel 100. Referring to FIG. 1, the second termination point, for example points 16B, 17B, and 18B, of the conductor, in this case conductors 16, 17, and 18, respectively, of the primary splice compartment 15 may have a temperature rating that is higher than a temperature rating of the electrical equipment, in this case panel 100. Thus, the additional compartments 12 and 15 may house terminals for connecting a higher temperature rated cable to a relatively lower temperature rated piece of electrical equipment, such as panel 100, than would be possible if an external conductor were connected directly to the electrical equipment.

Figure 1A:
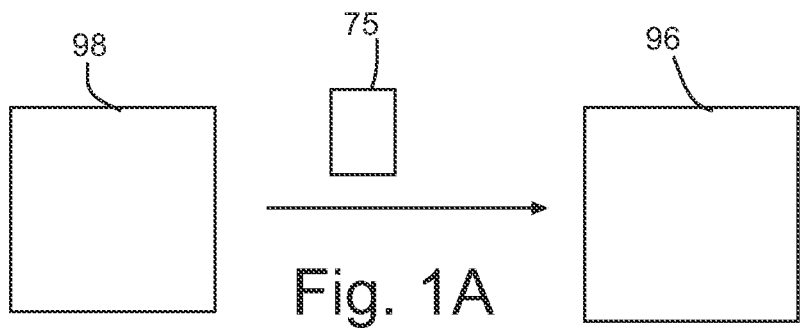
FIG. 1A illustrates a method of manufacturing and installing an electrical apparatus.

Referring to FIG. 1A, a method may comprise prefabricating, at a prefabrication facility 98, an electrical apparatus 75 by mounting or integrally forming a splice compartment, such as compartments 11 and 15, adjacent an external part of a main housing 10. An external part is understood to include a part that defines an outer periphery of the main housing. Mounting the splice compartment to or outside the outer periphery of the main housing distances the splice compartment from the heat generation that may occur within the main housing, for example caused by operation of an internal breaker, and that may otherwise contribute to a relatively low temperature rating for all conductors within the main housing 10. The main housing and/or splice compartments may include respective covers, for example to provide respective rainproof enclosures.

Referring to FIG. 1A, the method may include installing the electrical apparatus 75 at an end user facility 96, which is remote from the prefabrication facility 98. In some cases the prefabrication facility 98 is at least five, ten, fifteen, or more kilometers away from the end user facility 96. The apparatus 75 may be pre-fabricated and transported to a distribution and/or storage facility (not shown), where the apparatus may be sold and/or shipped out to the end user on demand. An example of an end user facility 96 includes a building or refinery, and installing includes permanent installation for the purpose of running an electrical system that incorporates the electrical equipment. At some point in the method, for example during prefabrication, electrical equipment may be enclosed within the main housing, and a conductor may be extended (pre-wired) between the main housing and the splice compartment. At least some of the plurality of conductors may be pre-wired out-of-electrical contact with the electrical equipment, to provide an electrician with the flexibility to decide whether or not to use the conductor if needed during the installing stage.

The apparatus 75 may be pre-fabricated with one or more of the electrical equipment and a conductor 16 lacking. In some cases the main housing and splice compartment are configured to, in use, permit a conductor to extend from a first conductor termination point, defined within the main housing, to a second conductor termination point, defined within the splice compartment. In some cases the main housing may be configured to enclose electrical equipment in use. If the electrical equipment and/or conductor is not assembled with the apparatus 75 in the prefabricating stage, which may occur in sub-stages across one, two, or more facilities, then such may be added during an installation stage.

Electrical equipment may include any device or appliance that in use runs a current within a housing to perform a function at an end user facility 96. Appliances may carry out the functions of clothes washing, air-conditioning, food mixing, and deep frying for several examples. In some cases, during use the electrical equipment carries out one or more of the following electrical functions: distribution, switching, voltage modifying, current modifying, energy conversion, energy generation, light generation, or overcurrent protection. The electrical equipment may generate sufficient heat during use such that within the main housing and the electrical equipment, conductors are temperature rated to a maximum of 75 degrees Celsius, in some cases a maximum of 60 degrees Celsius.

In some cases electrical equipment may be provided with an additional compartment which could be internal or external separated from the main housing of the equipment and the equipment termination point. Provisions for wiring may be put in place from the manufacturer or added at the time of installation, and such conductors maybe based on the equipment temperature rating typically 75 degrees Celsius or less, in some cases 60 degrees Celsius. The internal conductors may be wired from the termination point of the equipment a minimum of 1.2 meters in length to the additional compartment at the line and or load conductor connection point, typical conductors used are rated at 90 degrees Celsius.

Figure 3:
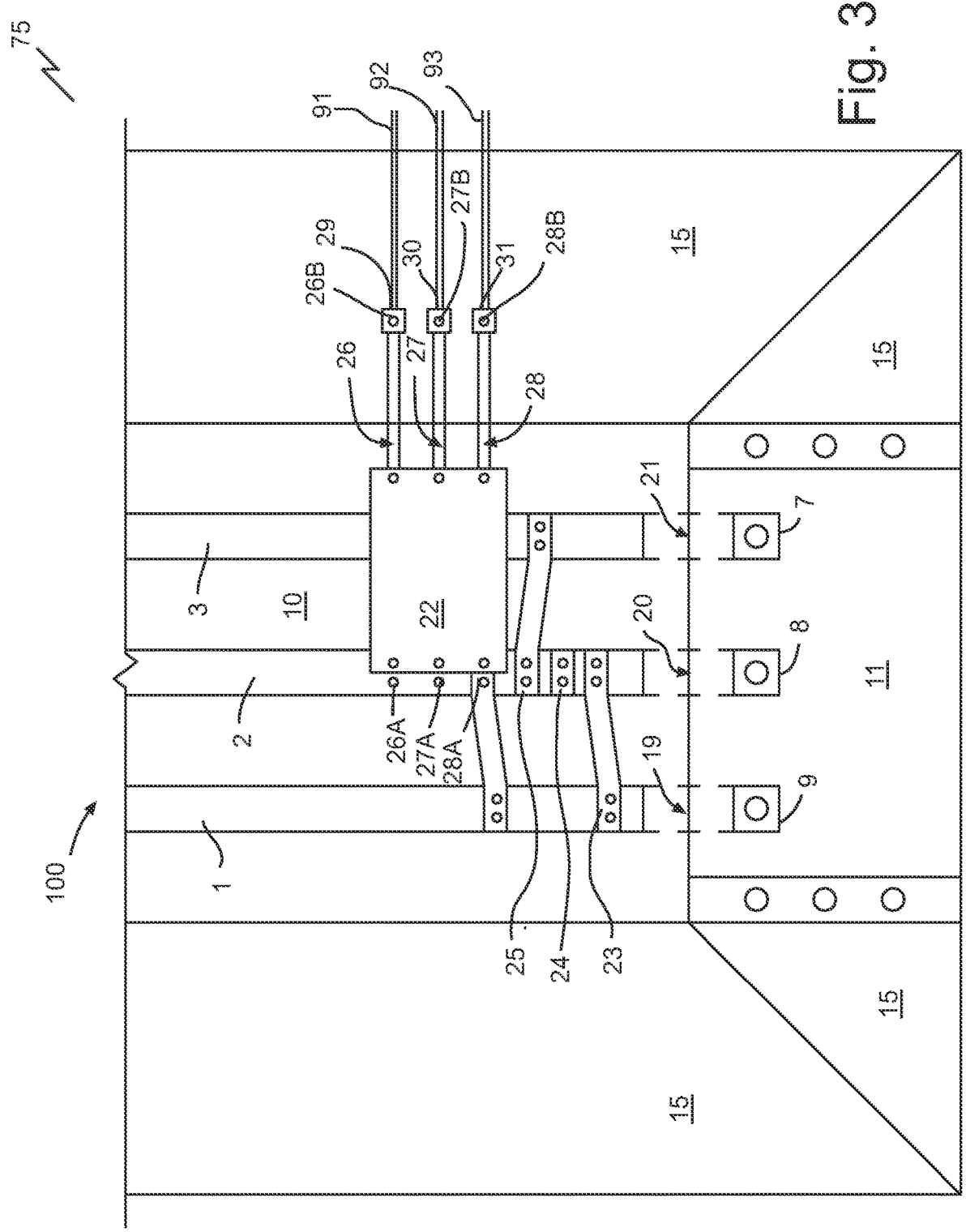
FIG. 3 is a front elevation schematic view of a breaker connection with primary and secondary lug kits and an example of how such terminate within the secondary compartment.

Referring to FIG. 3, an external circuit conductor, for example conductors 91, 92, and 93, may extend from outside both the splice compartment 15 and main housing 10, and into electrical contact with the second termination point, in this case points 26B, 27B,a and 28B, respectively. The external circuit conductor may have a temperature rating that is higher than the temperature rating of the electrical equipment, in this case panel 100, in use. As shown the external circuit conductor may comprise a plurality of respective external circuit conductors, each electrically connected between a respective conductor, of the plurality of conductors, and each forming part of a respective independent external circuit of a plurality of independent external circuits. In the example shown, the conductors 91, 92, and 93 may extend to independent respective external circuits. An independent circuit would be one where one or more of conductors 91, 92, and 93, are not associated with each other in any way, for example if each conductor 91, 92, and 93 ran in different directions to different outlets. In other cases, two or more of conductors 91, 92, and 93 may be associated with each other on the same external circuit, for example if one conductor formed a positive lead, another conductor formed a negative lead, and the third a neutral lead or ground.

Referring to FIG. 3, in some cases a cross-sectional diameter of the external circuit conductor, for example conductor 91, is smaller than a cross-sectional diameter of the conductor, for example conductor 26. In most cases where a relatively higher temperature conductor, in this case conductor 91, connects to a relatively lower temperature ampacity rated conductor, in this case conductor 26, the load conductor 91 would be one size smaller. In some cases the size is more than one size smaller, with sizes referring to wire gauges, see Table 1 for examples of such. The use of a relatively thinner diameter conductor 91 as an external circuit conductor reduces the cost of materials required to complete the external circuit, and hence reduces the cost of the electrical work at the end user facility 96. In some cases, for a ten panel installation a cost savings of $35,000 or more may be realized by dropping one wire gauge from conductors 26 to conductors 91.

Referring to FIG. 4, in some cases the conductors, for example conductors 26, 27, and 28, may have a predetermined length selected to achieve the desired temperature rating at the second termination point. In some cases the conductor may have a length of 1.2 meters or greater, for example 3.0 meters. In some cases the conductor has a length of 1.2 to 1.8 meters. In some cases the conductor may be oversized in diameter to increase heat dissipation and reduce length.

Figure 2:
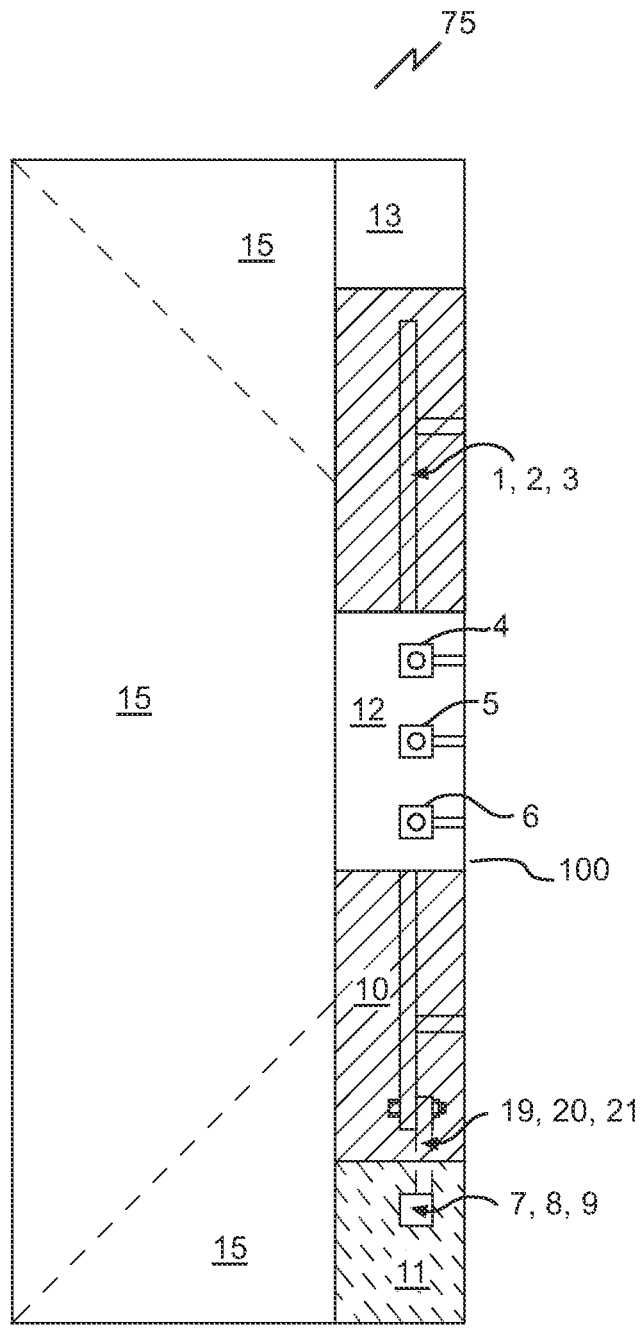
FIG. 2 is a right side elevation view of the distribution panel of FIG. 1.

Referring to FIGS. 3 and 4, the electrical equipment may comprise a distribution panel 100. A distribution board (also known as panelboard, breaker panel, or electric panel) is a component of an electricity supply system that divides an electrical power feed into subsidiary circuits, while typically providing a protective fuse or circuit breaker for each circuit in a common enclosure. Normally, a main switch, and in recent boards, one or more residual-current devices (RCD) or residual current breakers with overcurrent protection (RCBO), are also incorporated. In a North American distribution board, the circuit breakers are generally positioned in two vertical columns. Circuit breaker panelboards may be dead front, that is, the operator of the circuit breakers is unable to contact live electrical parts. During servicing of the distribution board itself, though, when the cover has been removed and the cables are visible, North American breaker panelboards commonly have some live parts exposed. In some cases a panel 100 includes a panelboard—a single panel or group of panel units designed for assembly in the form of a single panel, including buses and automatic overcurrent devices, and equipped with or without switches for the control of light, heat, or power circuits, designed to be placed in a cabinet or cutout box placed in or against a wall, partition, or other support, An embodiment of a distribution panel 100 is shown in FIGS. 1 and 2. Panel 100 may include first second and third primary power bus bars, 1, 2 and 3 in main compartment/housing 10, which provide connection points for respective first, second and third primary lug kits 23, 24 and 25, and breaker 22. In electric power distribution, a busbar (also bus bar, buss bar or bussbar) is a metallic strip or bar, typically housed inside switchgear, panel boards, and busway enclosures for local high current power distribution. Busbars are also used to connect high voltage equipment at electrical switchyards, and low voltage equipment in battery banks. They are generally uninsulated, and have sufficient stiffness to be supported in air by insulated pillars. These features allow sufficient cooling of the conductors, and the ability to tap in at various points without creating a Previously presented joint.

Plural splice compartments may be provided to provide flexibility on the entry and exit point or points for power going into and out of the panel 100. In the example four primary power in/out connection points are provided, located in compartments 11 through 14 (although more or fewer connections points may be present) providing access to panel 100 from all four sides and in some cases the rear or front of panel 100. These primary connection points may be enclosed within the compartments and separated from breaker 22 and/or secondary power supply points in secondary compartments 15.

Main housing 10, positioned centrally, may house a branch circuit breaker 22 and primary bus bars 1, 2 and 3. Compartment 11 may provide primary power in/out via bottom or rear entry. Compartment 12 may provide primary power in/out via a side or rear entry. Compartment 13 may provide primary power in/out via top or rear entry. Compartment 14 may provide primary power in/out via a side (opposite to that of compartment 12) or rear entry.

As shown in FIGS. 1 and 2 panel 100 may include first, second and third primary power in/out connections 4, 5, 6 positioned in primary compartment 12 on a side of panel 100 and first second and third primary power in/out connections, such as lugs 7, 8 and 9 in primary compartment 11 positioned proximate to either the top or bottom of panel 100 (shown in FIG. 1 proximate to the bottom of panel 100). Each primary panel or compartment 11 to 14 may have similar power in/out connections. Conductor passages (not shown) between splice compartments and the main housing may have pop-out parts to permit customization on location of the apparatus 75 to the facility. Each bus bar 1, 2 and 3 may have a primary power in/out side or rear attachments 16, 17, and 18, respectively, as shown in compartment 12, and primary power in/out bottom, top, or rear attachment (conductors) 19, 20 and 21, respectively, as shown in compartment 14 to connect to respective power in/out connections. The use of secondary compartments allows panel 100 to have a multi-purpose design and cater to typical code requirements. The design adds convenience to installation and modification processes, accomplished through primary compartments 11 through 14, breaker 22, and secondary compartments 15.

The primary and/or secondary splice compartments on electrical equipment as included for in this document, may contain secondary termination points for connected conductors. The connected conductor primary and secondary termination points may be pre-wired by the manufacturer, from the primary connection from the termination point of the electrical equipment to the secondary connection to the termination point in the additional compartment, which houses the connecting conductor's secondary termination point. This may be done with consideration given to temperature limitation of the conductors.

Referring to FIG. 4, one or more splice compartments, such as compartment 15, may be used for power metering. Thus, when energized, power may flow through branch circuits and pass meter 99, where power use may be conveniently monitored on-panel. The separated primary and or secondary compartments within panel 100 may thus create an environment that allows for the installation of one or more current transformers for metering purposes. By contrast, in most jurisdictions a current transformer for power metering may not be permitted to be installed within main housing 10 containing breaker 22 due to safety and temperature concerns.

Figure 6:
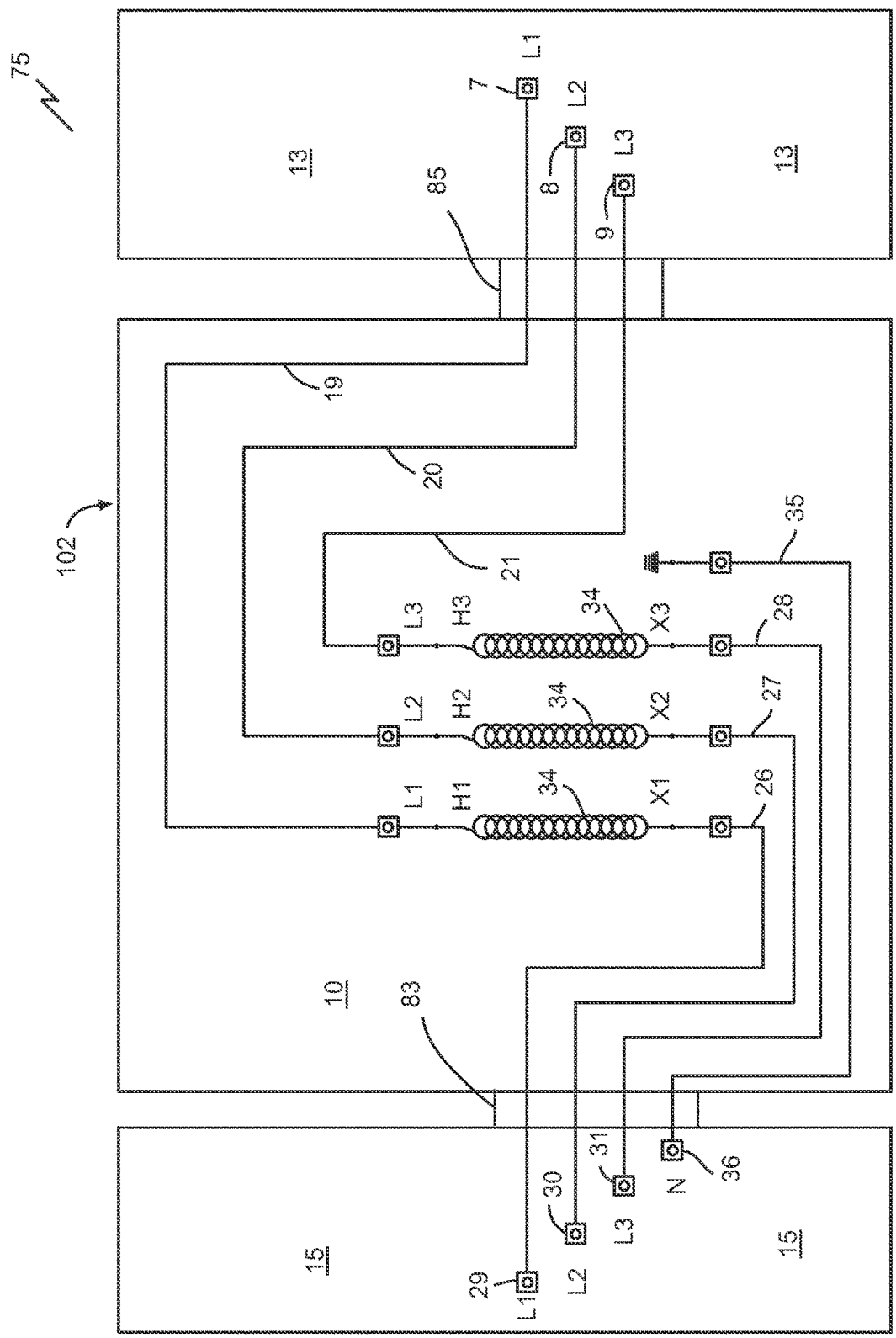
FIG. 6 is a side elevation schematic view of a transformer with primary and secondary splice compartments connected to the main housing via raceways.

Referring to FIG. 6, one or more splice compartment 15 may incorporate a race way, such as race ways 83 and 85, containing conductor lugs 29, 30, and 31, and 19, 20, and 21, between splice compartments 15 and 13, respectively, and main housing 10. The conductor passage may be defined by such a raceway or raceways, which may connect the main housing and splice compartment, in abutting relationship, or in a spaced relationship as shown. The raceway may form part of a rigid pre-fabricated connection between the splice compartment and the main housing 10. The term raceway or wire way may mean a suitable structure for installing wires, and may be fully enclosed or may have open access from at least one side. The compartments may be separated from each other via grounded metal barriers. As shown in FIGS. 1 to 3, compartments 11 and 12 may be open while the other compartments 13, 14 remain closed. In some embodiments of panel 100, access to primary compartments 11 to 14 may only be available through secondary compartments 15.

Referring to FIG. 3, where the conductor, such as conductors 26, 27, and 28, form part of a branch circuit, a branch circuit overcurrent protection device, such as a branch circuit breaker 22, may be used. The circuit breaker 22 may be mounted in the main housing. Because the breaker 22, which generates heat during use, is spaced from the splice compartment 15, the compartment 15 is still able to achieve a relatively higher temperature rating for internal conductors. With reference to FIG. 3, a representative circuit drawing for compartments 11 and 15 is shown. Breaker 22 for branch circuit supply may be connectable to primary lugs (or lug kits) 23, 24 and 25 and secondary lugs (or lug kits) 26, 27 and 28, which in turn may be connected to branch circuit terminal connection points (lugs) 29, 30 and 31, respectively in compartment 12.

In some cases the apparatus 75 may permit the ability to splice or tap conductors and typical conductor terminal connections within the additional compartment. Splicing or tapping may be done by using raised insulated terminal lugs, within the compartments. Such may also create the ability to attach additional equipment to the primary and secondary compartments such as motor starters, contactor panels, switches or the like. A lug is an electrical connector, for example, a bolt on an enclosure tied to an electric potential within the enclosure, supporting the connection of a cable. Lugs may be provided integrally or in the form of lug kits that may be added or removed to the system as desired Secondary lugs of lug kits (conductors) 26 to 28 may create attachment points between the breakers 22 and the branch circuit connection lugs 29, 30, 31. The secondary branch circuit connection points may allow for a higher circuit temperature rating at the termination point of the branch circuits which is located in the secondary compartments 15. Such may be accomplished in various ways such as the length of the secondary lugs, size of the secondary lugs, type of material used for the secondary lugs and/or but no limited to the type of insulation used on the secondary lug kit or conductor. The separation of the secondary branch connection points in a separate compartment from breaker 22 may allow for the temperature rating of the circuit to match the rating on a terminal block and/or the conductor depending on which has the lowest rating, which may be for example 90 degrees Celsius.

Figure 4A:
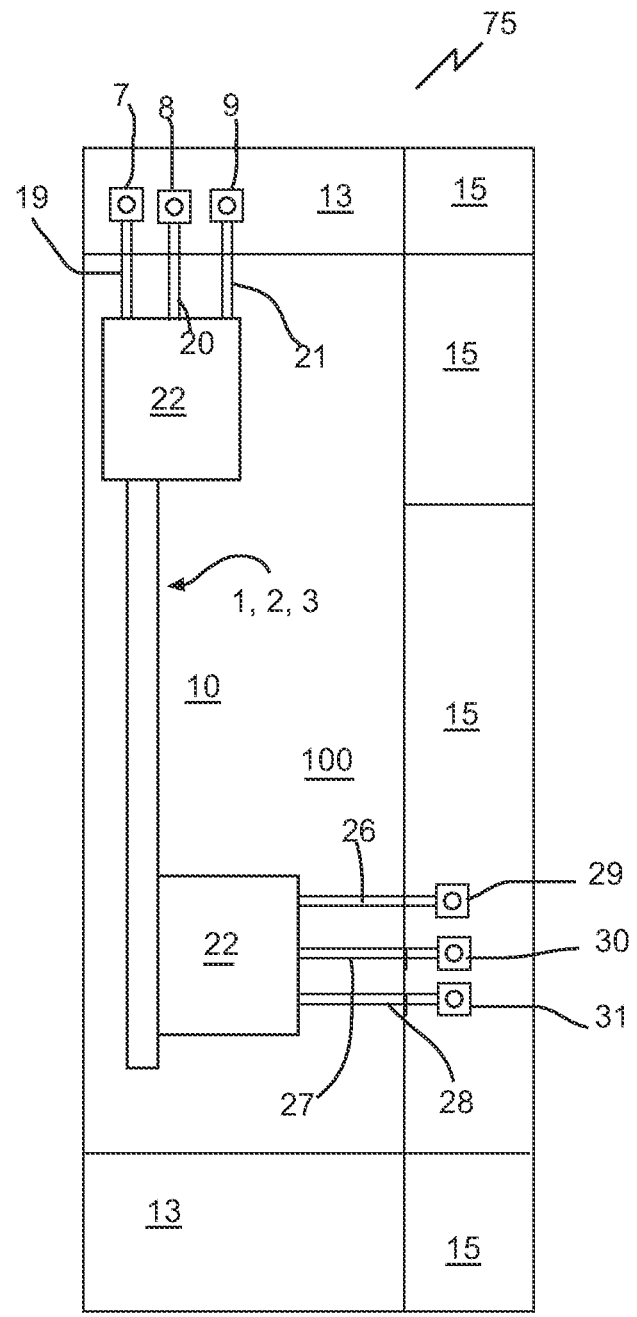
FIG. 4A is a left side elevation view of the distribution panel of FIG. 4.

Referring to FIGS. 1, 2, 4, and 4A, panel 100 may have a suitable shape and configuration. Referring to FIGS. 1 and 2, splice compartment 15 may wrap around the sides and rear of the main housing 10, to provide a full wrap around with front access point for the main housing and splice compartments. Such a configuration also provides access to the secondary splice compartments 15 from almost 360 degrees of angular direction, relative to an axis 87 normal to the main housing 10. Referring to FIGS. 4 and 4A another embodiment is shown with the main housing 10 positioned to the rear of the panel 100, and a plurality of secondary splice compartments arranged to the front and about the periphery of the main housing 10, to provide access to the splice compartments from almost 360 degrees of angular direction. The primary splice compartments 13 may be located at the rear of the panel 100. Secondary compartments 15 may be able to serve many purposes, including to provide a wire way, a wire splice connection point for branch circuits, secondary metering, primary metering and/or a termination compartment. The separation from breaker 22 relieves concerns created from the heat generated by breaker 22.

FIG. 4 is an example of a Power Distribution Panel 100 that contains the main housing 10 which houses the breakers, bus bars, primary and secondary conductors. Primary compartment 13 may contain the termination point for connecting conductors. Secondary compartment 15 may contain the termination points for connecting conductors. A main overcurrent protection device, such as breaker 32, may be connected one or both of upstream of the distribution panel (not shown) or within the distribution panel (shown), in which the second termination point has a temperature rating that is higher than a temperature rating of the main overcurrent protection device.

Referring to FIG. 3, in some cases the splice compartment may provide a termination point for an aluminum conductor. For example, the external circuit conductor 91 may comprise an aluminum conductor, and the connecting conductor 26 may comprise a non-aluminum conductor, such as a copper wire. Panel 100 may thus cater to the use of aluminum wires at termination points, which may be aluminum connection points or a termination point configured to be part of an aluminum conductor connection, and may be separated from fluctuating temperatures of the breaker 22 in main housing 10. By spacing the second termination point outside the main housing, in a relatively more thermally stable environment than that found in the main housing, the fluctuation in temperature at the second termination point is reduced, thus reducing the relatively high expansion and contraction rate of aluminum that otherwise creates problems by loosening lugs and connections when such connections are present in the main housing.

In some cases apparatus 75 may achieve a safety and operations benefit to a distribution panel with the addition of the secondary compartment. If individual compartments were used for each circuit, such creates a condition in which wiring and equipment can be added or removed without having to shut down or de-energize the entire panel. Instead, work can be done on a branch circuit by merely locking out a single breaker pertaining to the circuit being worked on, and such could be done with the use of cover plates over exposed energized terminal lugs and pre-installed breakers along with secondary wiring to the additional compartment. Adjustable trip breakers may be superior for some installations where the addition and or deletion of equipment would be likely, such as welding or fabrication facilities. In such facilities there may be an increased efficiency by having the panel left in operation all well meeting safety requirements of de-energizing equipment to be worked on.

Figure 5:
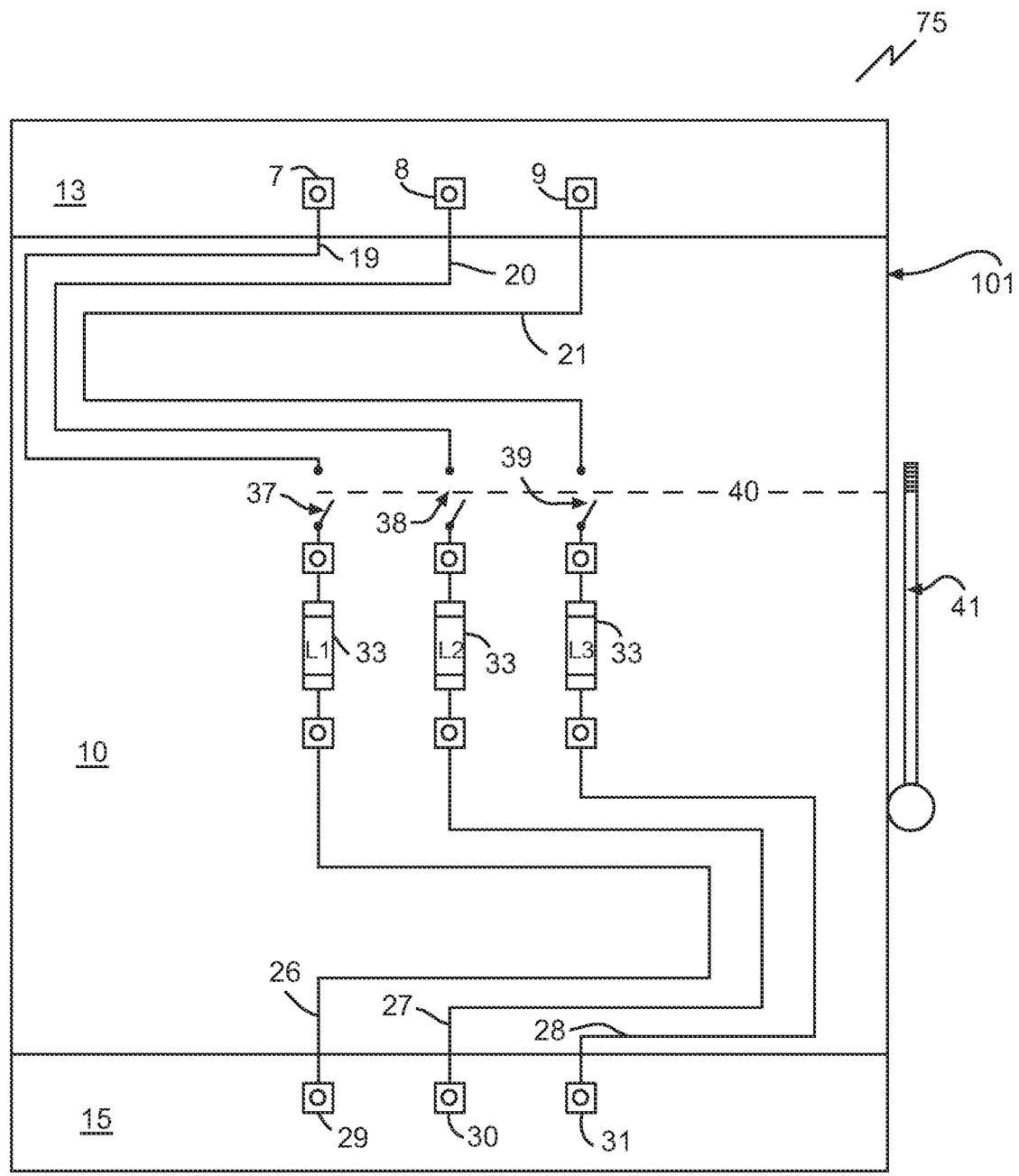
FIG. 5 is a side elevation schematic view of a fused disconnect switch with primary and secondary splice compartments.
Figure 7:
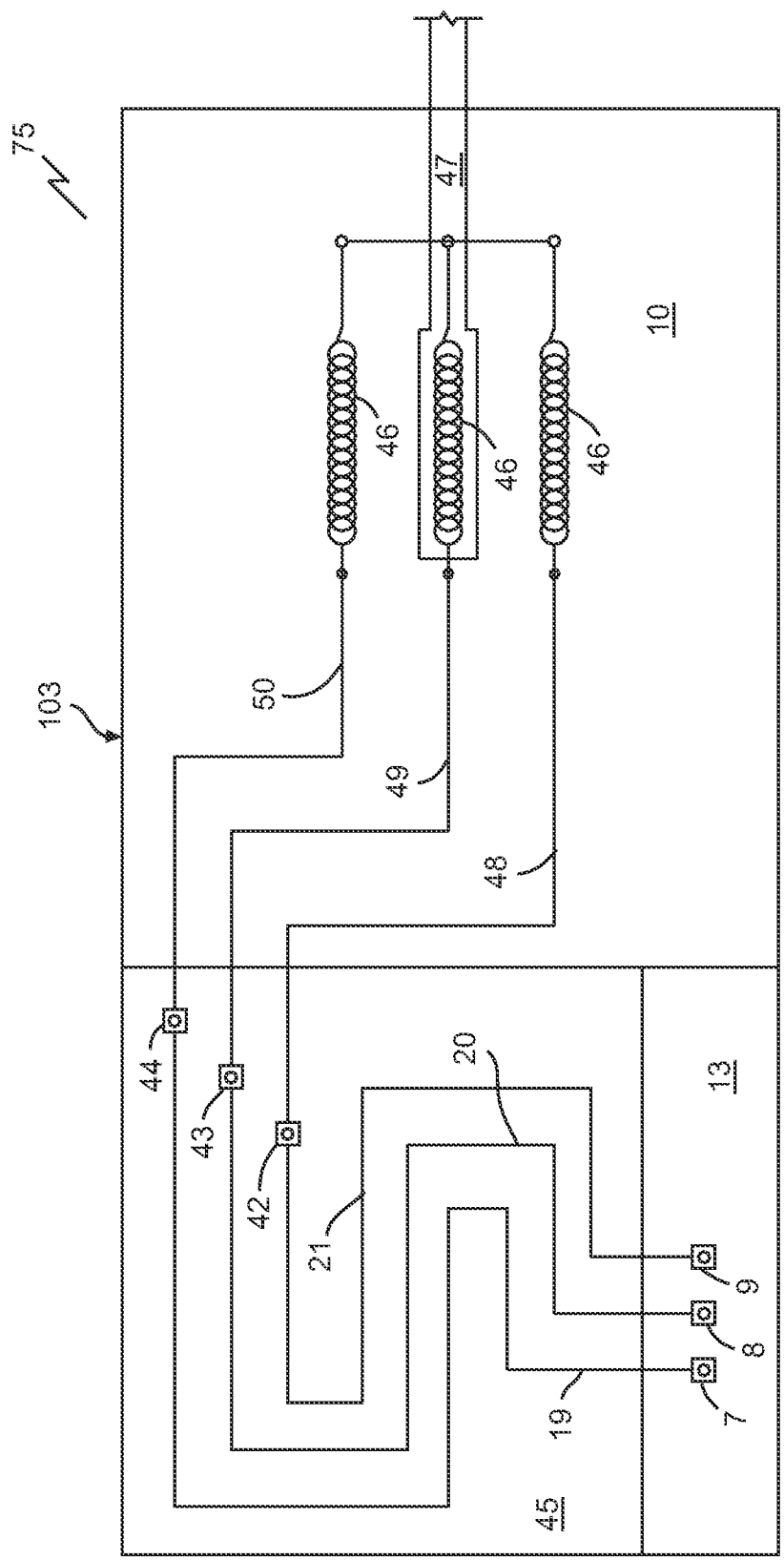
FIG. 7 is a side elevation schematic view of a motor with a splice compartment connected to the main housing.

Referring to FIGS. 5-7, embodiments of apparatus 75 incorporating electrical equipment other than a distribution panel 100 are illustrated. Electrical equipment may comprise one or more of switchgear, a transformer, a motor control panel, a motor, a motor starter, a generator, a light fixture, a fused disconnect switch, an unfused disconnect switch, a power monitor, and a motor disconnect switch.

FIG. 5 is an example of a fused disconnect switch 101. The switch 101 may be contained within the main housing 10, which houses the fuses, fuse holders, disconnect switch with external operating handle and the equipment termination points. Primary compartment 13 may contain the termination point for connecting conductors. Secondary compartment 15 may contain the termination points for connecting conductors. Switchgear may include an assembly completely enclosed on all sides and top with sheet metal and containing primary power circuit switching, interrupting devices, or both, with buses and connections. The assembly may include control and auxiliary devices. Access to the interior of the enclosure is provided by doors, removable covers, or both. The enclosures/housings may have ventilations openings.

FIG. 6 is an example of a transformer 102. Transformer 102 may be contained within the main housing 10, which houses coils, coil mounting brackets, internal wiring and equipment termination points. Primary compartment 13 may contain the termination point for connecting conductors. Secondary compartment 15 may contain the termination points for connecting conductors.

FIG. 7 is an example of a motor 10. The motor 10 may be enclosed by the main housing 10, which houses the coils, shaft, internal wiring. Compartment 45 houses the equipment termination points and secondary wiring to compartment 13 which houses the termination point for connecting conductors. In a generator embodiment, the current may flow in the reverse direction as shown. Industrial plants may commonly incorporate backup power generators, which may provide the reverse energy flow of the motor example, where the rotation of shaft 47 creates electricity that flows out of the system via conductors 19, 20, and 21.

There are many variations of electrical equipment wiring, including but not limited to three phase, single phase, hi voltage, low voltage, with or without neutral conductors, with or without a main breaker, with or without a grounding conductor. Such variations all consist with this panel and are to all be taken as part of its variations. In other alternative embodiments, wire ways may be added and separate compartments may be added to contain, for example, a fuse body, unfused disconnect switches, fused distribution panels and/or breaker panels. Panel 100 may be manufactured to adapt to existing distribution panels or the like for Previously presented or retrofit installations. Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure of this document is defined and limited only by the claims that follow. This document describes electrical equipment such as but not limited to switchgear, motor control panels, transformers, distribution panels, motors, generators, light fixtures, fused disconnect switches, unfused disconnect switches, motor disconnect switches and the like.

Electrical equipment as per this document may come with any variation of compartments and lug kits, such as primary compartment and conductors only, or secondary compartment and conductors only. Or it could include both primary and secondary compartments and conductors. In some cases, the electrical equipment could contain only one compartment containing both primary and secondary conductors with their pertaining termination points, any variation which complies with the code requirements.

Reference Numeral List 1, 2 & 3: Primary power bus bars, the connection points for the breakers primary lug kit 23, 24 & 25 and breakers 22.
4, 5 & 6: Primary power in or out side connection, lugs only no main breaker 32.
7, 8 & 9: Primary power conductor termination point.
10: Main housing of the pertaining electrical equipment and the equipment termination point. It includes but not limited to; breakers, bus bars, fuses, coils, disconnect switches, motors, generators and the like.
11: Primary power in and or out compartment and conductor termination point.
12: Primary power in and or out compartment and conductor termination point.
13: Primary power in and or out compartment and conductor termination point.
14: Primary power in and or out compartment and conductor termination point.
15: Secondary compartment and conductor termination point.
16, 17 & 18: Primary power conductors, wired from equipment termination point in main housing 10 to compartment 12.
19, 20 & 21: Primary power conductors, wired from equipment termination point in main housing 10 to compartment 11, 12, 13 & 14 respectively.
22: Secondary breaker for connected loads.
23, 24 & 25: Primary lugs or lug kit for breaker 22 which connect the breaker to the bus bars 1, 2 & 3.
26, 27 & 28: Secondary lugs or lug kit for breaker 22 which connect the equipment termination point to the conductor termination point. 29, 30 & 31.
29, 30 & 31: Conductor termination point in the secondary compartment 15.
32: Main or primary breaker for incoming power supply.
33: Fuses.
34: Transformer coils.
35: Neutral Conductor.
36: Neutral termination point for connecting conductor.
37, 38 & 39: Disconnect switches.
40: Mechanical link from switches 37, 38 & 39 to operating external handle 41.
41: Operating handle for disconnect switches 37, 38 & 39.
75: pre-fabricated electrical apparatus
96: end user facility
98: prefabricating facility
99: power metering device/transformer
100: Example of an electrical distribution panel.
101: Example of an electrical fused disconnect switch.
102: Example of an electrical transformer.
103: Example of an electrical motor or generator.

It is to be noted that the primary and secondary compartments and conductors could be manufactured to adapt to existing electrical equipment or manufactured complete for Previously presented installations. Compartments disclosed within this document are separated from the main body of the electrical equipment using a barrier or by attaching externally connected compartments to the main body respectively. Connecting the splice compartment and the housing 10 may be achieved by a suitable mechanism such as via a wire way, fastener, weld, adhesive, or other mechanisms. Integral formation may be achieved by the sharing of a common barrier wall, between the housing 10 and splice compartment. The diagrams are examples only and could be manufactured in many ways for all applicable voltages, amperages, phases, neutral and or grounding requirements. Cross sectional diameters may refer to average cross sectional diameters along an axial length of the conductor. As will be apparent to those skilled in the art, the various embodiments described above can be combined to provide further embodiments. Aspects of the present systems, methods and components can be modified, if necessary, to employ systems, methods, components and concepts to provide yet further embodiments as disclosed in this document. For example, the various methods described above may omit some acts, include other acts, and/or execute acts in a different order than set out in the illustrated embodiments. Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the disclosure of this document to the specific embodiments disclosed in the specification and the claims, but should be construed to include all possible embodiments along with the full scope of equivalents to which such claims are entitled. Accordingly, the subject matter of this document is not limited by the disclosure, but instead its scope is to be determined entirely by the following claims.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method comprising:
   assembling an electrical apparatus for installation into an electricity supply system at an end user facility;
   in which the electrical apparatus comprises a main housing configured to enclose electrical equipment in use;
   in which assembling further comprises:
   mounting, or integrally forming, a splice compartment external to and adjacent the main housing, with a conductor passage defined between the main housing and the splice compartment; and extending a conductor within the conductor passage from a first conductor termination point, defined within the main housing, to a second conductor termination point, defined within the splice compartment, with the splice compartment being structured to, and the conductor being sized to have one or more of a sufficient length or cross-sectional diameter to permit the second conductor termination point to have a temperature rating that is higher than a temperature rating of the electrical equipment.

2. The method of claim 1 in which the conductor is oversized in length to permit the second conductor termination point to have a temperature rating that is higher than a temperature rating of the electrical equipment.

3. The method of claim 2 in which the conductor is oversized in length by having a length of 1.2 meters or greater to permit the second conductor termination point to have a temperature rating that is higher than a temperature rating of the electrical equipment.

4. The method of claim 3 in which the conductor has a length of 1.2 to 1.8 meters.

5. The method of claim 1 further comprising:
installing the electrical apparatus into an electricity supply system at an end user facility; and
extending an external circuit conductor from outside both the splice compartment and main housing, and into electrical contact with the second conductor termination point, the external circuit conductor having a temperature rating that is higher than the temperature rating of the electrical equipment in use.

6. The method of claim 5 in which a cross-sectional diameter of the external circuit conductor is smaller than a cross-sectional diameter of the conductor.

7. The method of claim 5 in which:
the conductor comprises a plurality of conductors that define respective first conductor termination points and second conductor termination points; and
the external circuit conductor comprises a plurality of respective external circuit conductors, each electrically connected between a respective conductor, of the plurality of conductors, and each forming part of a respective independent external circuit of a plurality of independent external circuits.

8. The method of claim 7 further comprising electrical equipment enclosed by the main housing, in which at least some of the plurality of conductors are pre-wired out-of-electrical contact with the electrical equipment.

9. The method of claim 5 in which the external circuit conductor comprises an aluminum conductor, and the conductor comprises a non-aluminum conductor.

10. The method of claim 1 further comprising:
installing the electrical apparatus into an electricity supply system at an end user facility; and mounting electrical equipment enclosed by the main housing, in which the electrical equipment carries out one or more of the following electrical functions: distribution, switching, voltage modifying, current modifying, energy conversion, energy generation, light generation, or overcurrent protection.

11. The method of claim 10 in which the electrical equipment comprises a distribution panel.

12. The method of claim 11 in which the conductor forms part of a branch circuit, which includes a branch circuit breaker located within the main housing.

13. The method of claim 11 further comprising a main overcurrent protection device connected one or both of upstream of the distribution panel or within the distribution panel, in which the second conductor termination point has a temperature rating that is higher than a temperature rating of the main overcurrent protection device.

14. The method of claim 11 in which the electrical equipment is rated to carry a maximum voltage of up to and including 600 V.

15. The method of claim 1 in which the splice compartment comprises a plurality of splice compartments each containing respective conductors.

16. The method of claim 15 in which:
the plurality of splice compartments comprise a primary splice compartment and a secondary splice compartment; and
the primary splice compartment is configured to supply electricity to the electrical equipment in use, and the secondary splice compartment is configured to receive electricity from the electrical equipment in use.

17. The method of claim 16 in which the second conductor termination point of the conductor of the primary splice compartment has a temperature rating that is higher than the temperature rating of the electrical equipment.

18. The method of claim 1 further comprising:
installing the electrical apparatus into an electricity supply system at an end user facility; and
mounting electrical equipment enclosed by the main housing, in which the electrical equipment comprises one or more of switchgear, a transformer, a motor control panel, a motor, a motor starter, a generator, a light fixture, a fused disconnect switch, an unfused disconnect switch, a power monitor, and a motor disconnect switch.

19. The method of claim 1 in which the splice compartment comprises a power metering device.

20. The method of claim 1 in which the conductor passage is defined by a raceway that connects the main housing and splice compartment.

21. The method of claim 1, further comprising installing the electrical apparatus into an electricity supply system at an end user facility, in which:
assembling comprises prefabricating, at a prefabrication facility, the electrical apparatus by mounting or integrally forming the splice compartment adjacent an external part of the main housing; and
in which the end user facility is remote from the prefabrication facility.

22. The method of claim 21 in which the prefabrication facility is at least five kilometers away from the end user facility.

23. The method of claim 1 in which:
assembling comprises prefabricating, at a prefabrication facility, the electrical apparatus by mounting or integrally forming the splice compartment adjacent an external part of the main housing, in which the extending stages is carried out during the prefabricating stage at the prefabrication facility.

24. The method of claim 1 further comprising:
installing the electrical apparatus into an electricity supply system at an end user facility;
enclosing electrical equipment within the main housing, the second conductor termination point having a temperature rating that is higher than a temperature rating of the electrical equipment; and
in which, after installing, the electrical equipment carries out one or more of the following electrical functions:

distribution, switching, voltage modifying, current modifying, energy conversion, energy generation, light generation, or overcurrent protection.

25. The method of claim 1 further comprising installing the electrical apparatus into an electricity supply system at an end user facility.

* * * * *